(12) United States Patent
Hosokawa et al.

(10) Patent No.: US 6,994,352 B2
(45) Date of Patent: Feb. 7, 2006

(54) ROTATION SHAFT SEAL

(75) Inventors: Atsushi Hosokawa, Arida (JP); Tomoya Inagaki, Arida (JP)

(73) Assignee: Mitsubishi Cable Industries, Ltd., Amagasaki (JP)

( * ) Notice: Subject to any disclaimer, the term of this patent is extended or adjusted under 35 U.S.C. 154(b) by 0 days.

(21) Appl. No.: 10/442,981

(22) Filed: May 22, 2003

(65) Prior Publication Data

US 2003/0222407 A1  Dec. 4, 2003

(30) Foreign Application Priority Data

May 30, 2002 (JP) .............................. 2002-156786

(51) Int. Cl.
*F16J 15/32* (2006.01)
(52) U.S. Cl. ..................................... 277/559
(58) Field of Classification Search ................. 277/559
See application file for complete search history.

(56) References Cited

U.S. PATENT DOCUMENTS

| 2,446,380 | A | * | 8/1948 | Meyers et al. ............... 277/559 |
| 3,376,045 | A | * | 4/1968 | Jagger ......................... 277/559 |
| 3,411,793 | A | * | 11/1968 | Jagger et al. ................ 277/559 |
| 3,501,155 | A | * | 3/1970 | Dega et al. .................. 277/309 |
| 4,132,421 | A | * | 1/1979 | Corsi et al. .................. 277/565 |
| 4,288,083 | A | * | 9/1981 | Braconier ................... 277/559 |
| 4,350,347 | A | * | 9/1982 | Heinrich ..................... 277/549 |
| 4,568,092 | A | * | 2/1986 | Hayashida et al. ......... 277/559 |
| 4,739,998 | A | * | 4/1988 | Steusloff et al. ............ 277/309 |
| 5,139,275 | A | * | 8/1992 | Ehrmann et al. ........... 277/559 |
| 5,511,886 | A | * | 4/1996 | Sink ........................... 384/486 |
| 5,730,444 | A | * | 3/1998 | Notter ......................... 277/554 |
| 6,517,083 | B2 | * | 2/2003 | Yamada et al. ............. 277/562 |
| 6,592,337 | B2 | * | 7/2003 | Yamada et al. ........... 417/222.2 |

* cited by examiner

*Primary Examiner*—Alison K. Pickard
(74) *Attorney, Agent, or Firm*—Armstrong, Kratz, Quintos, Hanson & Brooks, LLP

(57) ABSTRACT

A rotation shaft seal to seal liquid, which is poor of lubricant liquid, stably for a long time. In a rotation shaft seal, provided with a rubber lip portion having a sliding inner peripheral edge portion which contacts a rotation shaft to seal liquid on a pressure chamber side, a lubricant liquid well portion is disposed near the sliding inner peripheral edge portion.

1 Claim, 3 Drawing Sheets

ROTATION SHAFT SEAL

BACKGROUND OF THE INVENTION

1. Field of the Invention

This invention relates to a rotation shaft seal.

2. Description of the Related Art

Conventionally, for sealing between a rotation shaft and a casing, rotation shaft seals such as an oil seal have been used. Each of these seals has a rubber lip portion sliding on a peripheral face of the rotation shaft with line contact.

In the conventional oil seal above, abrasion problems are not generated on the rubber lip as long as the rubber lip portion is dipped in oil (lubricant oil). However, depending on used state or condition, liquid of which component is mostly gaseous has to be sealed. In this state which is poor of lubricant oil, outer leakage is generated because the rubber lip is rapidly abraded, or rubber material is heat-degenerated (hardened) for the heat of rotational sliding and cracks are generated.

It is therefore an object of the present invention to provide a rotation shaft seal having long life in which early abrasion and crack are not generated even in the state poor of lubricant.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
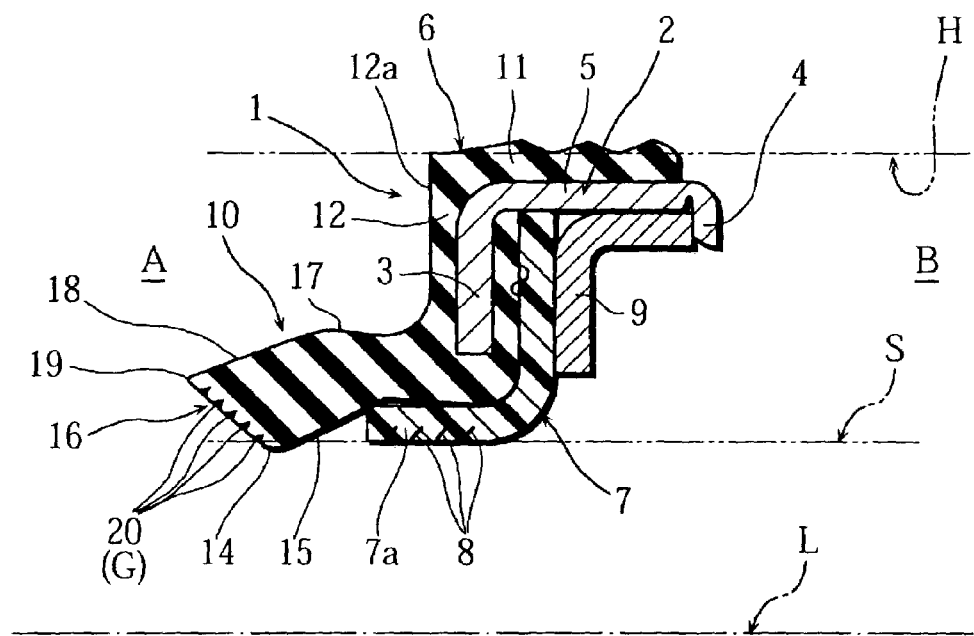
FIG. 1 is a cross-sectional view of a principal portion showing a first embodiment of the present invention.
Figure 2:
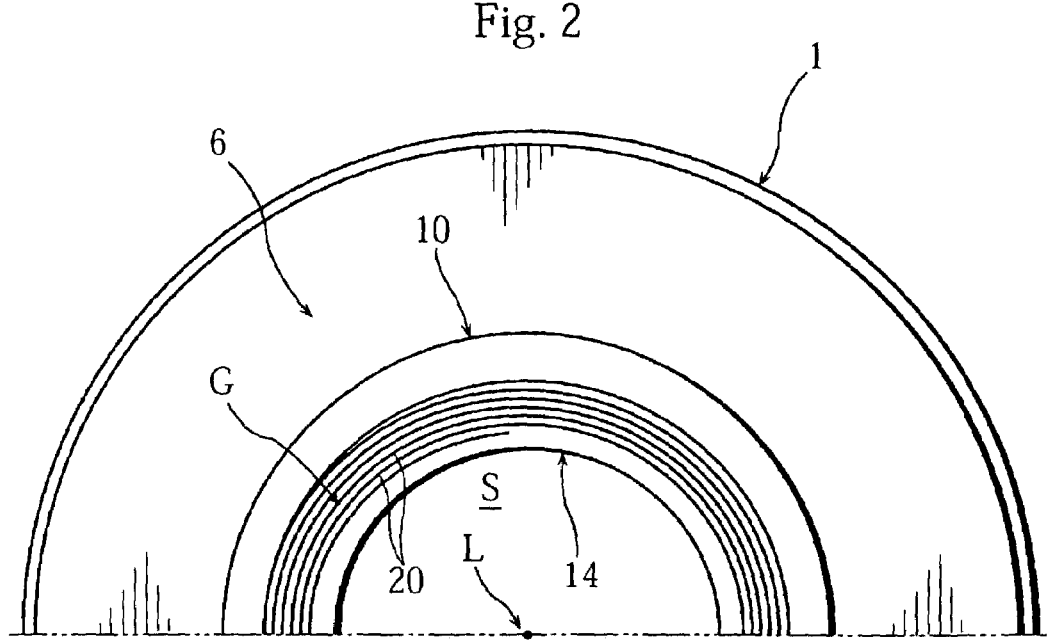
FIG. 2 is a front view of a principal portion.

In a first embodiment shown in FIG. 1 showing a cross-sectional view and FIG. 2 showing a front view, a rotation shaft seal 1 relating to the present invention is set between a rotation shaft S and a housing H shown with two-dot broken lines.

A mark 2 represents an outer case of metal composed of a cylinder portion 5 and inner brim portions 3 and 4 on the both sides of the cylinder portion 5. The inner brim portion 3 on a pressure chamber side A on a left side of FIG. 1 is sufficiently extended in an inner diameter direction.

And, a mark 6 represents a seal portion of rubber unitedly fixed to a peripheral face of the outer case 2 and both sides of the inner brim portion 3 on the pressure chamber side A and a low-pressure chamber (atmosphere) side B by adhesion, deposit welding, fusion welding, heat molding, etc.

A mark 7 represents a seal element with a groove 8, and a mark 9 represents an inner case of metal pressing a back face (a face on the low-pressure chamber side B) to hold the seal element 7 by pinching strongly with the inner brim portion 3 and the inner case 9 along with a part of the seal portion 6 of rubber. The small inner brim portion 4 on the low-pressure chamber side B, deformed as to be in the inner diameter direction by plastic work in assembly to give the pinching force by pushing an end face of the inner case 9 on the low-pressure chamber side B.

Concretely, the seal portion 6 of rubber has concavo-convex wave portion on the peripheral face, a housing press-fit wall portion 11 fixed to the peripheral face of the cylinder portion 5 of the outer case 2, a wall portion 12 at right angles with axis of which cross section is U-shaped fixed as to cover the inner brim portion 3, and a rubber lip portion 10 extending from an inner end edge of the wall portion 12 toward the pressure chamber side A.

The rubber lip portion 10 has a sliding inner peripheral edge portion 14 sliding on the rotation shaft S with line contact to seal the liquid on the pressure chamber side A.

To describe the rubber lip portion 10 further concretely, an inner face on a base end of the rubber lip portion 10 extends to the pressure chamber side A as the seal element 7 of L-shaped cross section is along an inner peripheral wall portion 7a sliding on the rotation shaft S or forming a slight gap, namely, a small gap gradually enlarging toward the pressure chamber side A. And the rubber lip portion 10 has a sloped face 15 near an end of the inner peripheral wall portion 7a (the end on the pressure chamber side A) of the seal element 7 gradually approaching the rotation shaft S until the edge portion 14.

The rubber lip portion 10 has a sloped face 16, starting from the edge portion 14, gradually parting from the rotation shaft S. Consequently, the edge portion 14 has an angled convex cross section.

On the other hand, the rubber lip portion 10 continues to a cylindrical peripheral face portion 17 approximately parallel to an axis L through a vertical face 12a of the wall portion 12 on the pressure chamber side A and an R-shaped corner portion, reaches for a top end 19 on the pressure chamber side A with an end diminishing portion 18, and crosses the sloped face 16 with the top end 19.

The top end 19 is formed as to have an angle smaller than right angle (acute angle) in cross section.

The liquid on the pressure chamber side A to which the rotation shaft seal 1 is applied is mostly gaseous, and lubricant liquid such as lubricant oil may exist as mist. Therefore, a lubricant liquid well portion G is formed on the rubber lip portion 10. That is to say, a spiral groove 20 in the rotational direction of the rotation shaft S is formed near the edge portion 14 and on the pressure chamber side A, namely, on the sloped face 16.

In other words, the spiral groove 20 is formed on the sloped face 16 gradually approaching the rotation shaft S from the top end 19 toward the edge portion 14 as the lubricant liquid (such as lubricant oil) moves spirally along with the rotation of the rotation shaft S to be supplied to the edge portion 14.

For example, in FIG. 2, the spiral groove 20 is formed as to proceed from the peripheral side to an inner side with rightward rotation when the rotation shaft S is rightward (clockwise). As described above, with the spiral groove 20 in the same direction as the rotation direction of the rotation shaft S, the lubricant liquid in the spiral groove 20 on the sloped face 16 is moved along with the rotational movement of the rotation shaft S by surface tension to compensate the shortage of lubricant liquid on the edge portion 14. And, the spiral groove 20, unitedly molded with the rubber or mechanically formed by engraving, has long holding length of the lubricant liquid to hold sufficient lubricant liquid, and supply the lubricant liquid to the edge portion 14 for a long time.

Next, in a second embodiment shown in a cross-sectional view of FIG. 3 and a front view of FIG. 4, while explanations of same marks showing similar composition to that of FIGS. 1 and 2 are omitted, different points are as follows.

That is to say, the lubricant liquid well portion G is composed of plural concave grooves 21 disposed radially when observed in the axis L direction of the rotation shaft S.

Figure 3:
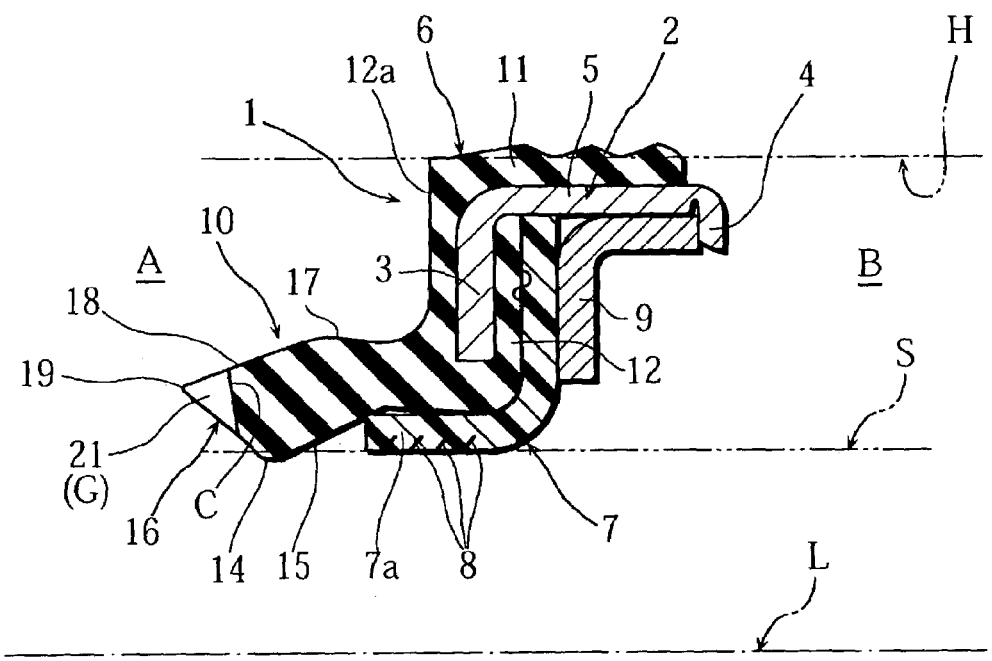
FIG. 3 is a cross-sectional view of a principal portion showing a second embodiment of the present invention.
Figure 4:
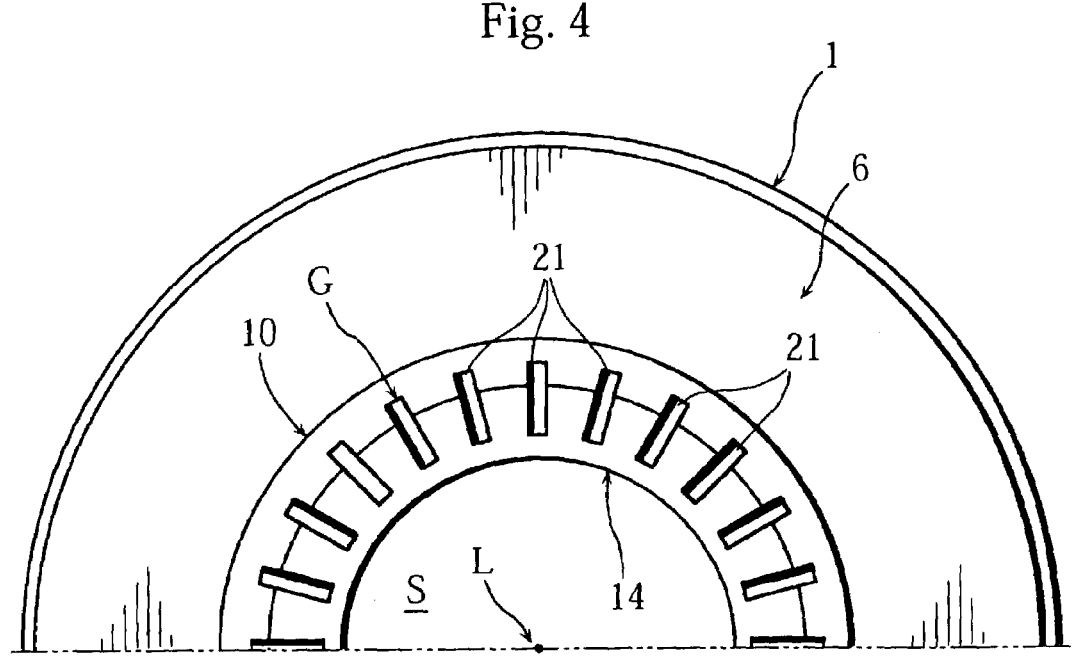
FIG. 4 is a front view of a principal portion.

In FIG. 3, the concave groove 21 has a triangle cross section one of which peaks is the top end 19, and a side C on a base end side is inclined backward (to the low-pressure chamber side B) in comparison with a face at right angles with the axis L to easily introduce the lubricant liquid to the edge portion 14.

Width, depth, and number of the concave groove 21 are freely changed corresponding to characteristics of the lubricant liquid such as viscosity and service condition. And, the concave groove 21 may be unitedly molded with the rubber lip portion 10, or formed by mechanical work after the molding. The concave grooves 21 in FIGS. 3 and 4 are to facilitate the lubricant liquid to drop and effective under the circumstance in which supply of the lubricant liquid is considerably poor.

Next, in a third embodiment shown in a cross-sectional view of FIG. 5 and a front view of FIG. 6, while explanations of same marks showing similar composition to that of FIGS. 1 and 2 are omitted, different points are as follows.

Figure 6:
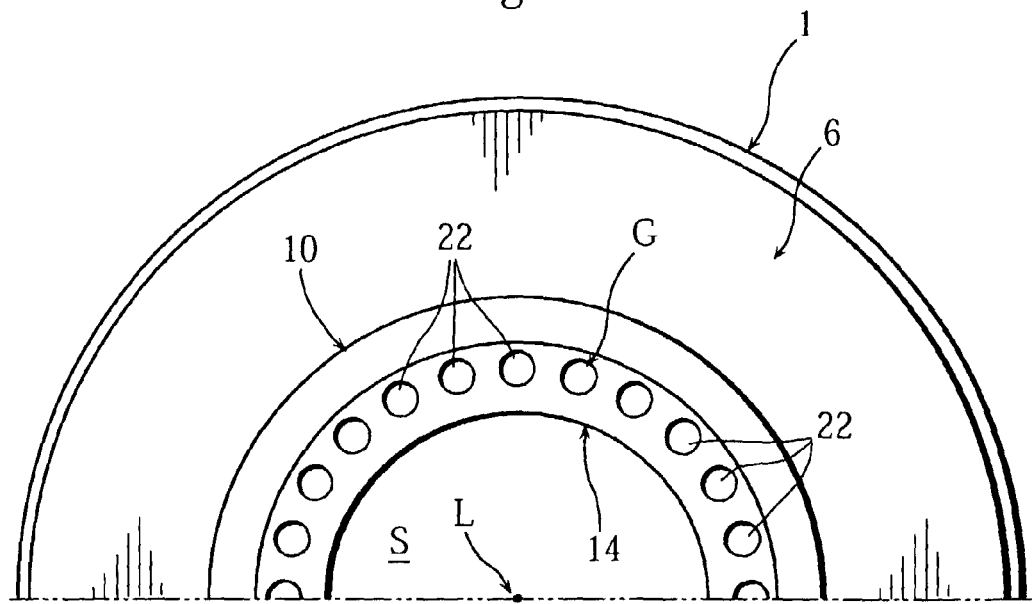
FIG. 6 is a front view of a principal portion.

That is to say, the lubricant liquid well portion G is composed of plural hole portions 22 each of which has a bottom disposed circularly when observed in the axis L direction of the rotation shaft S (FIG. 6).

Figure 5:
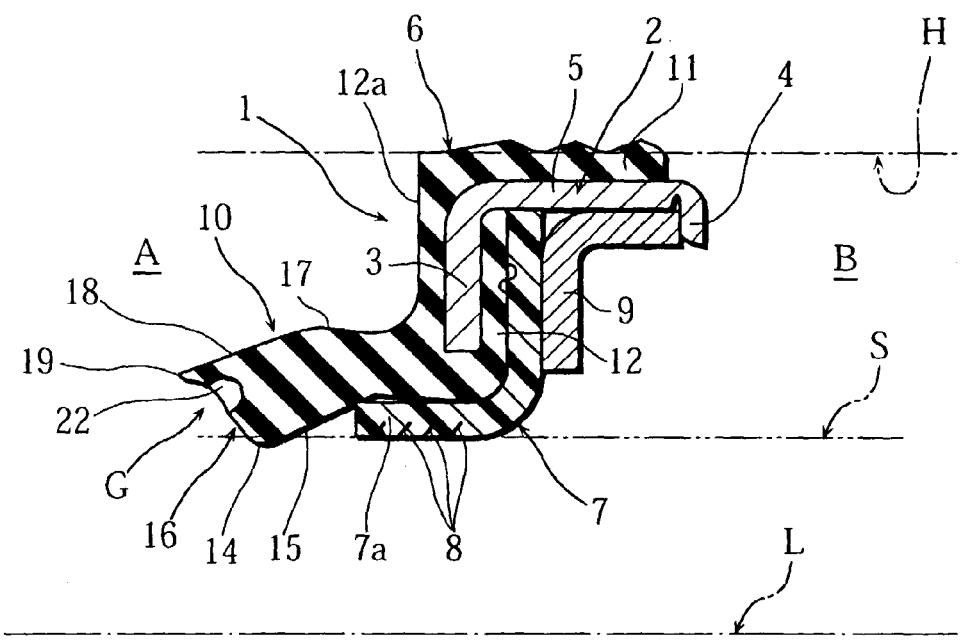
FIG. 5 is a cross-sectional view of a principal portion showing a third embodiment of the present invention.

In FIGS. 5 and 6, the hole portion 22 is concave and approximately a half sphere. This configuration may be changed to cylindrical or cubic. And, the hole portion 22 having a bottom as in FIGS. 5 and 6 easily generates surface tension to certainly hold the lubricant liquid further, and keeps the lubricant liquid supplied to the edge portion 14 for a long time.

In the present invention, in which the lubricant liquid well portion G is disposed on the position near the edge portion 14 on the pressure chamber side A, a little amount of liquid leaks out of the pressure chamber side A on the contact portion of the edge portion 14 and the rotation shaft S (sealed portion) toward the low-pressure chamber side B while the rotation shaft is rotating to generate sucking force toward the low-pressure chamber side B, the lubricant liquid dropping out of (seeping through) the lubricant liquid well portion G is supplied to the contact portion (sealed portion) to lubricate.

The present invention preferable, for example, for sealing cooling medium of a compressor, especially, of high-speed rotation and high pressure, can always supply small amount of the lubricant liquid, and effectively prevent the sliding inner peripheral edge portion 14 of the rubber lip portion 10 from early abrasion to extend life of the rotation shaft seal. And, it is also effective to restrain sliding heat which causes cracks.

In the present invention, not restricted to the embodiment shown in Figures, the seal element 7 may be increased in number (or omitted, on the contrary), a metal case may be added for backup, the inner case 9 may be deformed or added, and other constructions and configurations may be freely changed.

According to the rotation shaft seal of the present invention, even if applied to sealed liquid poor of lubricant liquid such as lubricant oil, the edge portion 14 (as the sealing portion) is not rapidly abraded, cracks are prevented, and life of the seal is sufficiently extended.

And, small amount of the lubricant liquid in the spiral groove 20 can be supplied stably to the edge portion 14 along with the rotation of the rotation shaft. The stable supply is long-term further because the holding length of the lubricant liquid is large.

And, the lubricant liquid easily drops out of the radial concave groove 21 onto the edge portion 14 sliding on the rotation shaft S on the inner peripheral side, and the lubricant liquid can be effectively supplied under the circumstance considerably poor of the lubricant liquid.

Further, the lubricant liquid is held by the surface tension in the hole portion 22 to supply the lubricant liquid stably for a long time.

While preferred embodiments of the present invention have been described in this specification, it is to be understood that the invention is illustrative and not restrictive, because various changes are possible within the spirit and indispensable features.

What is claimed is:
1. A rotation shaft seal comprising:
a rubber lip portion having a sliding inner peripheral edge portion sliding on a rotation shaft with line contact to seal liquid on a pressure chamber side; and
a seal element arranged partially under said rubber lip portion on a low-pressure chamber side of said rubber lip portion,
wherein the seal element has a spiral groove which sends liquid back to the pressure chamber side utilizing a hydrodynamic effect while the rotation shaft is turning,
wherein a lubricant liquid well portion of the rubber lip portion is disposed on a position near and spaced from the sliding inner peripheral edge portion and on the pressure chamber side to the sliding inner peripheral edge portion, and
wherein the lubricant liquid well portion is composed of a spiral groove moving spirally along with the rotation of the rotation shaft to supply the lubricant liquid to the sliding inner peripheral edge portion.

* * * * *